United States Patent
Steggles

(10) Patent No.: US 9,766,616 B2
(45) Date of Patent: Sep. 19, 2017

(54) TAGLESS TRACKING

(71) Applicant: Ubisense Limited, Chesterton, Cambridge (GB)

(72) Inventor: Peter Joseph Steggles, Cambridgeshire (GB)

(73) Assignee: Ubisense Limited, Chesterton, Cambridge (GB)

( * ) Notice: Subject to any disclaimer, the term of this patent is extended or adjusted under 35 U.S.C. 154(b) by 0 days.

(21) Appl. No.: 14/765,529

(22) PCT Filed: Jan. 29, 2014

(86) PCT No.: PCT/EP2014/051680
§ 371 (c)(1),
(2) Date: Aug. 3, 2015

(87) PCT Pub. No.: WO2014/118205
PCT Pub. Date: Aug. 7, 2014

(65) Prior Publication Data
US 2015/0378355 A1    Dec. 31, 2015

(30) Foreign Application Priority Data

Feb. 4, 2013 (GB) .................................. 1301942.7

(51) Int. Cl.
*G05B 19/418* (2006.01)
*G06Q 10/06* (2012.01)
*G06Q 10/08* (2012.01)

(52) U.S. Cl.
CPC ......... *G05B 19/4183* (2013.01); *G06Q 10/06* (2013.01); *G06Q 10/0833* (2013.01); *G05B 2219/42337* (2013.01)

(58) Field of Classification Search
CPC . G05B 19/4183; G06Q 10/06; G06Q 10/0833
See application file for complete search history.

(56) References Cited

U.S. PATENT DOCUMENTS

| 7,055,233 B1 | 6/2006 | Hofer et al. |
| 7,650,202 B2 | 1/2010 | Strohband et al. |
| (Continued) | | |

FOREIGN PATENT DOCUMENTS

WO    2012107300 A1    8/2012

OTHER PUBLICATIONS

"International Search Report and Written Opinion issued in International Application No. PCT/EP2014/051680", Apr. 22, 2014, Publisher: International Searching Authority / EPO, Published in: EP.

*Primary Examiner* — Leon Flores
(74) *Attorney, Agent, or Firm* — Kaplan Breyer Schwarz, LLP

(57) ABSTRACT

A method of identifying an article on a production line, the production line comprising a plurality of articles along its length, the relative positions of the plurality of articles along the length of the production line being predetermined, the method comprising: receiving location information of an object which executes the same motion with respect to at least a first subset of the plurality of articles on the production line; for at least a second subset of the plurality of articles, determining from the location information the location of the object at a predetermined interaction between the object and the article; and identifying an article of the plurality of articles at a specified location of the object in dependence on (i) a known location of any one article of the plurality of articles at any one time, and (ii) the locations of the object at the predetermined interactions between the object and the at least second subset of the plurality of articles.

20 Claims, 5 Drawing Sheets

(56) References Cited

U.S. PATENT DOCUMENTS

2005/0108115 A1\* 5/2005 Green ................. G06Q 10/087
                                                   705/28
2005/0113949 A1   5/2005 Honda
2010/0030353 A1\* 2/2010 Koishi ............... G05B 19/4183
                                                   700/96

\* cited by examiner

TAGLESS TRACKING

BACKGROUND OF THE INVENTION

Modern factory production lines are highly efficient. The operation of production lines has developed over the years to decrease the costs of manufacturing products, primarily by decreasing the time taken to manufacture products, which in turn is achieved by increasing the throughput of articles on production lines. Such developments include, for example: carrying out tasks on a production line whilst the production line is moving; dividing the production up into small tasks, each worker carrying out one task repetitively on each article on the line; locating everything needed to carry out a task, for example accessories and tools, next to the production line where the task is to be carried out; and developing machines to carry out operations previously done by hand. All work carried out on a production line can be divided into two types of activity: the first type adds value to the final product by, for example, attaching a new component; the second type is 'non-value-add' work, which includes worker motion, selecting parts, and identifying parts and products to some computerized production line control system. One of the main goals of production line design is to eliminate non-value-add activities as far as possible, hence increasing the throughput of articles on the production line.

In tandem with the desire to decrease manufacturing costs of products by increasing the throughput of articles on production lines, is the desire to maintain quality control of those products. However, quality control measures generally involve testing, checking, and recording results of those tests and checks. The act of recording a result necessarily involves a non-value-add identification task, so that the tests are assigned in some computer system to the product on which they have been performed. Such measures increase the overall time taken to manufacture a product, which conflicts with the desire to minimise manufacture time.

It is often necessary to identify and/or locate an article on a production line. For example, if it is determined that an article does not meet quality control measures, then that article is identified such that it can be appropriately dealt with. Identification is a non-value-add activity, and hence it is desirable to perform identification in the minimum time possible. There are several known methods of identifying articles on production lines. In the field of vehicle manufacture, it is known to attach a tag to either the vehicle or the vehicle carrier. The tag transmits location signals comprising an identifier of the vehicle to a tracking system comprising a set of sensors mounted in the factory. This method requires the application of a tag to the vehicle or vehicle carrier. Subsequently the tag is removed. The processes of applying and removing a tag to an article on a production line are non-value-add activities. They increase the time taken to process the article on the production line, and hence reduce the throughput of articles on the production line. This is particularly problematic if several tags need to be applied and removed from an article during the manufacturing process, for example as a result of a vehicle changing vehicle carrier or changing production line. This is also problematic for small scale systems for which the time taken to apply and remove a tag is significant relative to the time that the article is on the production line. Additionally, such systems generally require extraction of information about the production line from the system controlling the production line, for example the speed of the production line. This requires some integration of the tracking system software and the production line control system software. Production line control systems are not standardised across the production line industry, hence this integration must be carried out each time the tracking system is to be operated in combination with a different production line control system.

It is also known to identify a vehicle by detecting its movement past specified locations on a production line. For example, a rotary encoder may be attached to the production line. The rotary encoder rotates through an angle proportional to the displacement of the line. Its rotation is measured and encoded by, for example, placing holes evenly spaced around its circumference and detecting each hole using a fixed light source/detector, such as a LED/photodiode combination. The location of the vehicle with respect to the production line is known, and hence the vehicle can be identified. Production line positioning using encoders is not standardised across the production line industry, hence integration tasks must be carried out each time a system is deployed in a new production line. Furthermore, such systems are only available on a small proportion of all production lines.

Thus, there is a need for a tracking system which identifies articles on a production line accurately without requiring additional non-value-add tasks on the production line, and which is suitable for application to any production line irrespective of the specific production line control system used.

SUMMARY OF THE DISCLOSURE

According to a first aspect, there is provided a method of identifying an article on a production line, the production line comprising a plurality of articles along its length, the relative positions of the plurality of articles along the length of the production line being predetermined, the method comprising: receiving location information of an object which executes the same motion with respect to at least a first subset of the plurality of articles on the production line; for at least a second subset of the plurality of articles, determining from the location information the location of the object at a predetermined interaction between the object and the article; and identifying an article of the plurality of articles at a specified location of the object in dependence on (i) a known location of any one article of the plurality of articles at any one time, and (ii) the locations of the object at the predetermined interactions between the object and the at least second subset of the plurality of articles.

Suitably, the predetermined interactions occur when the object is stationary with respect to the production line.

Suitably, the method further comprises determining the speed of the production line in dependence on the locations of the object at the predetermined interactions between the object and the at least second subset of the plurality of articles.

Suitably, the production line is in a building having a floor, and for each article of the at least first subset of the plurality of articles, the object's same executed motion is the same relative to the floor.

Alternatively, the production line is in a building having a floor, and for each article of the at least first subset of the plurality of articles, the object's same executed motion is different relative to the floor.

Suitably, the production line comprises a further plurality of articles along its length interspersed with the plurality of articles.

Suitably, the method further comprises logging an action performed by an item at the specified location of the object in association with the identified article.

Suitably, the method further comprises logging a flaw detected by an item at the specified location of the object in association with the identified article.

Suitably, during each same executed motion an item performs a set of predetermined interactions, and the method further comprises: determining dwell time of each same executed motion during which the item is neither moving nor performing the set of predetermined interactions; and determining a different executed motion with respect to each of the at least first subset of the plurality of articles which reduces the dwell time such that the time taken to perform the set of predetermined interactions decreases.

Suitably, the item is the object.

Suitably, the location information of the object is received from a camera system.

Suitably, the object is a tagged object, and receiving location information of the object comprises receiving location signals originating from the tagged object.

Suitably, each location signal includes an identifier of the tagged object.

Suitably, the location signals are ultra-wideband signals.

Suitably, the method comprises receiving the location signals at a tracking system, the tracking system comprising a computing device and a plurality of receivers having known locations.

Suitably, the method comprises determining the locations of the tagged object from the time difference of arrival and/or the angle of arrival of the location signals at the plurality of receivers of the tracking system.

According to a second aspect, there is provided a tangible device-readable media with device-executable instructions that, when executed by a computing device, direct the computing device to perform steps comprising any of the methods of claims 1 to 16.

According to a third aspect, there is provided a tracking system for identifying an article on a production line, the production line comprising a plurality of articles along its length, the relative positions of the plurality of articles along the length of the production line being predetermined, the tracking system comprising: a receiver configured to receive location information of an object which executes the same motion with respect to at least a first subset of the plurality of articles on the production line; a memory device; a processor coupled to the memory device and the receiver, wherein the processor is configured to: for at least a second subset of the plurality of articles, determine from the location information the location of the object at a predetermined interaction between the object and the article; and identify an article of the plurality of articles at a specified location of the object in dependence on (i) a known location of any one article of the plurality of articles at any one time, and (ii) the locations of the object at the predetermined interactions between the object and the at least second subset of the plurality of articles.

BRIEF DESCRIPTION OF THE DRAWINGS

The present disclosure will now be described by way of example with reference to the accompanying drawings. In the drawings.

DETAILED DESCRIPTION

The following describes a tracking system suitable for tracking articles on a production line. The tracking system enables identification of an article at any location on the production line given knowledge of the location of one article at one time. This applies where the relative positions of articles on the production line are predetermined. Unlike known tracking systems, the described tracking system does not require tags to be applied to the articles or article carriers. Thus, the time that articles are on the production line is reduced because the steps of applying and removing tags are eliminated. Additionally, there is no need for integration of the tracking system software and the production line control system software. Typically, a production line worker who works on the articles on the production line executes the same operation with respect to each article on the production line. This repetitive motion is tracked and used, as described in the following, to identify and/or track articles on the production line.

Figure 1:
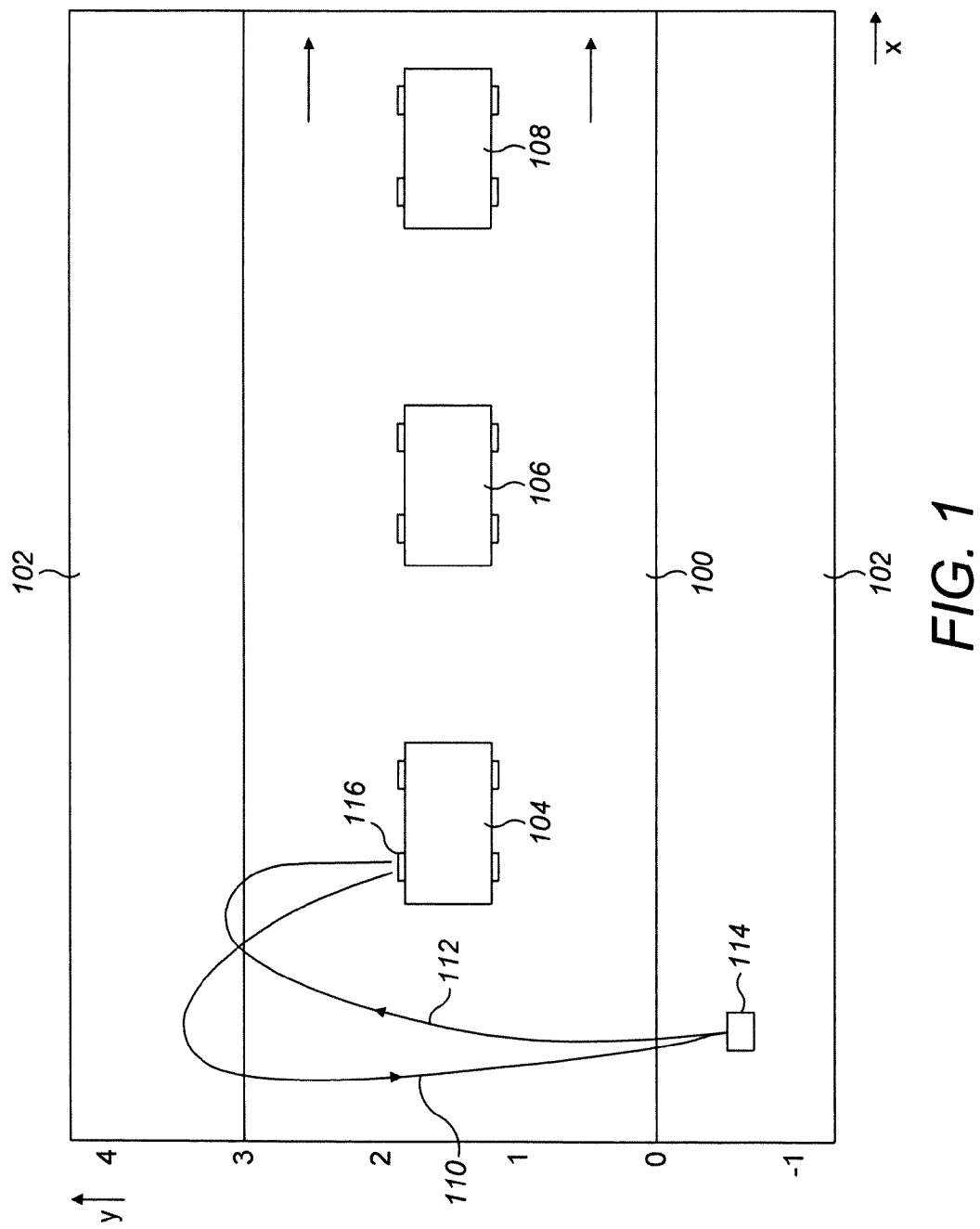
FIG. 1 illustrates the motion of a worker operating on a production line.

Reference is first made to FIG. 1, which illustrates an example of a worker operating on a vehicle production line. It will be understood that the following description extends to any article on a production line, and that reference to vehicles is used merely as an example. The production line 100 is moving to the right relative to the factory floor 102. Vehicles 104, 106 and 108 are illustrated along the length of the production line. Each vehicle is positioned wholly on the production line. Typically, the production line is of the order of 100 m in length. Typically, the spacing between the vehicles is about 6 m. Lines 110 and 112 illustrate the movement of a worker operating on the production line with respect to vehicle 104. At locations 114 and 116 the worker stops. This motion may correspond, for example, to a worker: (i) picking up a part from bin 114 which is located on the factory floor; (ii) stepping onto the moving production line whilst walking along line 112 to reach the vehicle's rear wheel 116; (iii) stopping on the production line at the rear wheel 116 to apply the part to the wheel; and (iv) returning to the bin 114 along path 110. Prior to performing this motion with respect to vehicle 104, the worker executed the same motion with respect to vehicles 106 and 108. The periodicity of the worker's motion relative to the vehicles on the production line can be used to: (i) determine the location of a vehicle, and/or (ii) identify a vehicle at a specified location.

Suitably, a tag is applied to the worker. Alternatively, a tag is applied to a tool that the worker operates. Applying a tag to the worker or tool instead of articles on the production line eliminates the non-value-add process of applying and removing tags from the articles on the production line. The tag comprises a transmitter which transmits location signals to a location system. Preferably, the tag transmits the location signals periodically. The rate at which a tag transmits location signals depends on the accuracy with which the location of the tag is to be known. The more frequent the location signal transmissions, the more accurately the location of the tag is known. The accuracy with which the location of the tag is to be known depends on the articles on the production line. For example, if the articles on the production line are closely packed together, then the location of the tag is to be known accurately such that the articles on the production line can be separately distinguished. For the example of a vehicle production line, a suitable rate of transmission by the tag is 2-4 Hz.

Preferably, the location signals transmitted by a tag each include an identifier. Typically, there will be more than one tag transmitting location signals which are detected by the location system. For example, there may be several workers working on the production line, each worker wearing a tag that periodically transmits location signals. The identifier in the location signals transmitted by each tag distinguishes that tag from the other tags in the system. Suitably, the location signals are ultra-wideband (UWB) signals. UWB signals are very high bandwidth radio frequency signals. UWB signals are pulses having very short wavelengths and hence are useful as location signals in enclosed environments like factories because their reflections off walls and other structures in the environment do not overlap with the original signals. This enables the location system to be able to more precisely determine the location of the tag compared to a traditional radio system whose received signals suffer from severe interference due to reflections.

Figure 2:
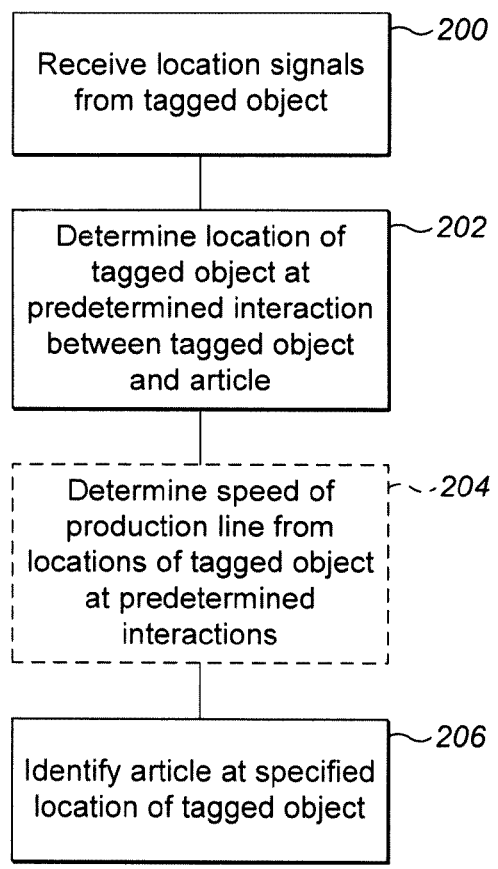
FIG. 2 illustrates a flowchart for the process carried out at a tracking system to identify an article on the production line.

Reference is now made to FIG. 2, which illustrates a flowchart of a process carried out at a location/tracking system in response to the location signals transmitted by a tag attached to a worker (or the worker's tool) operating on the production line. Suitably, the tracking system comprises a plurality of receivers which have known locations. The plurality of receivers receives the location signals transmitted by the tag. The tracking system also comprises a computing device. The computing device receives the location signals from the plurality of receivers, and determines the identity of an article at a specific location in dependence on those location signals. Typically, the receivers are mounted at known locations in the factory. The computing device may be co-located with one of the receivers. Alternatively, the computing device may be a physically separate device from the receivers.

At step 200, the computing device receives the location signals originating from the tagged object from the plurality of receivers. Suitably, the computing device uses location determining logic to determine the location of the tagged object at the time it sent out each location signal in accordance with known methods. For example, the location determining logic may use the known positions of the receivers and the time-difference-of-arrival (TDOA) of the location signals at the different receivers to determine the location of the tagged object. Alternatively, the location determining logic may use the known positions of the receivers and the angle-of-arrival (AOA) of the location signals at the different receivers to determine the location of the tagged object. As a further alternative, the location determining logic may use the known positions of the receivers and a combination of AOA and TDOA techniques to determine the location of the tagged object. Suitably, the determined locations of the tagged object are splined and/or interpolated using known techniques prior to being further analysed. For example, a Floater-Hormann rational interpolation technique may be used. The result is a smooth path representing the location of the tagged object over time. The path can be interpolated to extract a position of the tagged object at any point in time.

Figure 3:
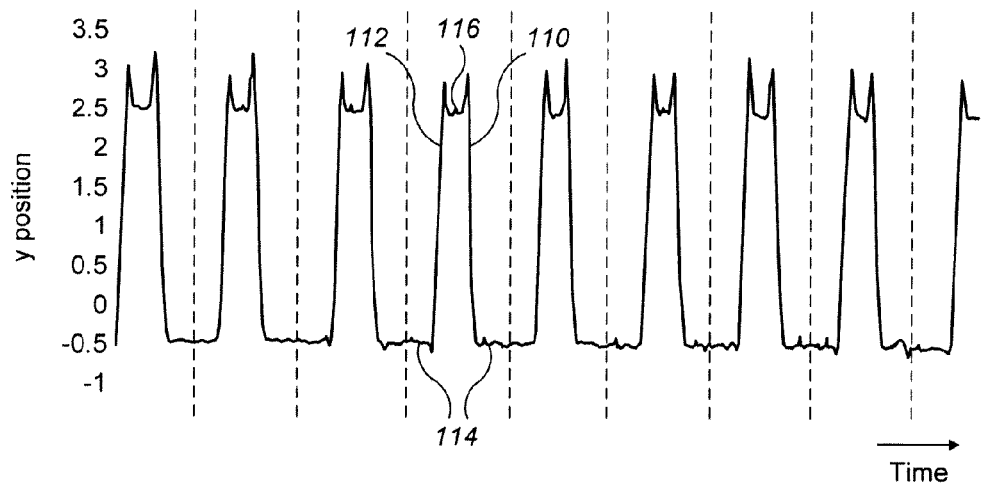
FIG. 3 is a graph illustrating the position of the worker of FIG. 1 in a perpendicular direction to the direction of motion of the production line.

FIG. 3 is an example graph illustrating the position of the tag perpendicular to the direction of motion of the production line (i.e. along the y-direction of FIG. 1) on the y-axis against time on the x-axis, when a worker performs the motion illustrated on FIG. 1 repetitively for each article on the production line. The origin on the y-axis is taken as the bottom edge of the production line on FIG. 1. The repetitive motion of the worker is visible from the repeated pattern on the graph, which has been bounded by vertical dotted lines. The worker performs the same motion within each pair of vertical dotted lines, but on a different article on the production line. Using the example motion described with respect to FIG. 1, it can be seen that the worker picks up a part from the bin 114 at the beginning of a repeated portion. During this time the worker is stationary at a position of −0.5 in the y-direction of FIG. 1, i.e. at bin 114. The worker then moves with constant velocity along the y-direction (line 112) to the vehicle's rear wheel 116. The worker stops moving at the wheel 116 to apply the part to the wheel, hence the y-position of 2.5 stays constant over this time. The worker then returns to the bin 114 along path 110 at constant velocity in the y-direction. The worker then repeats this motion on the next vehicle on the production line.

At step 202 of FIG. 2, the computing device determines the locations of the tagged object at a predetermined interaction between the worker and each article on the production line. Preferably, the predetermined interaction is the same interaction between the worker and each article. At the predetermined interaction, the worker is at a specific predetermined position relative to the article. The predetermined interaction chosen for this step will depend on the set of tasks that the worker performs on the article. Suitably, the worker is stationary on the production line at the predetermined interaction. For example, the worker may be knelt down on the production line tightening a nut on a wheel. As another example, the worker may be stood still on the production line fixing the front passenger's seatbelt strap into position. Suitably, the predetermined interaction is chosen from the set of tasks performed by the worker to be the task at which the position of the worker relative to the vehicle is constrained the most in order to carry out the task. This is because the following analysis assumes that the worker is positioned in the same place relative to each vehicle at the predetermined interaction.

Figure 4:
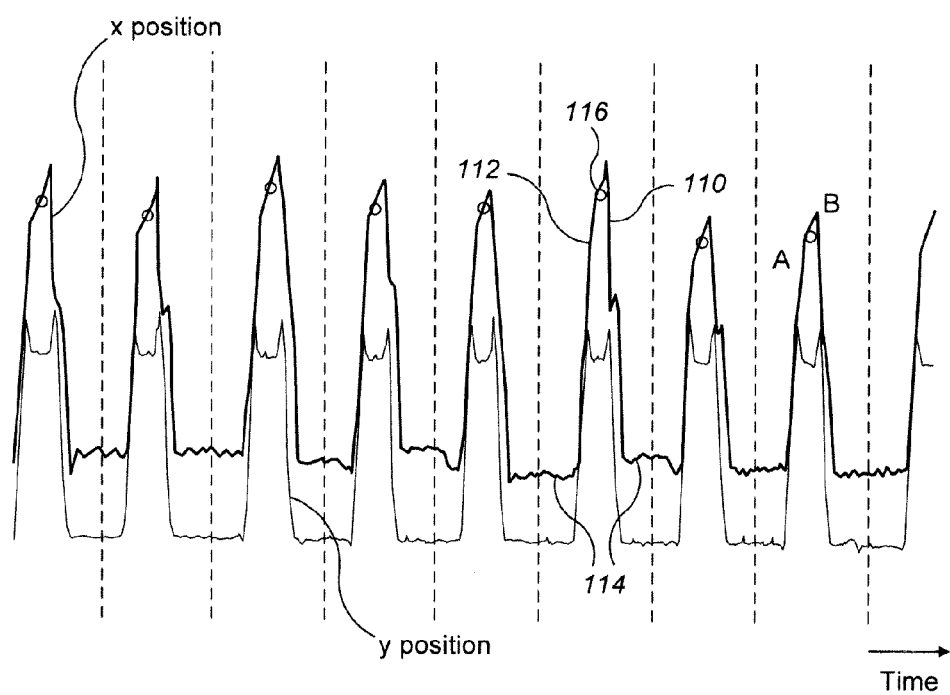
FIG. 4 is a graph illustrating the position of the worker of FIG. 1 in parallel and perpendicular directions to the direction of motion of the production line.

The predetermined interaction may be chosen from the location information received by the location system without knowledge of the tasks performed by the worker. FIG. 4 is an example graph illustrating the position of the tag against time resolved into components perpendicular to the direction of the production line (i.e. along the y-direction of FIG. 1) on the thinner line, and parallel to the direction of the production line (i.e. along the x-direction of FIG. 1) on the thicker line. The x-positions are plotted in the frame of reference of the factory floor. At 114 the x-position is stationary because the worker is standing at the bin on the factory floor. The x-position then exhibits constant velocity as the worker moves along path 112 to the vehicle's wheel 116. The x-position then exhibits constant velocity as the worker stops at the wheel 116 to apply the part to the wheel. At this time, the worker is moving relative to the factory floor at the constant velocity of the production line. The x-position then exhibits constant velocity as the worker returns along path 110 to the bin 114. Suitably, a filter is applied to the resolved x-positions of the tag to identify periods during which the tag is moving with a constant velocity in the x-direction that is not 0 m/s. Alternatively, a filter is applied to the resolved x-positions and y-positions of the tag to identify periods during which the tag is both (i) moving with a constant velocity in the x-direction, and (ii) located on the production line in the y-direction. Periods during which the constant velocity is greater than the maximum velocity of the production line are identified as periods during which the worker is moving relative to the production line, and are discarded. This leaves periods during which the worker is stationary with respect to the production line. These periods are candidates for the predetermined interaction of step 202 of FIG. 2. In the case of FIG. 4, the only period during each repeated pattern which satisfies these criteria is the period during which the worker is at position 116, i.e. when the worker is stationary on the production line applying the part to the rear wheel. If there is more than one candidate for the predetermined interaction within each repeated motion of the worker, then the candidate which is most consistent over the interactions with the plurality of articles is selected. Alternatively, the following analysis may be carried out on more than one predetermined interaction per repeated motion, and the results averaged.

Once the predetermined interaction is selected, the location data provides a set of representative points where the worker is located in the same place relative to each vehicle. For each period corresponding to the predetermined interaction, the average x-position is identified. For example, on FIG. 4, the mean position between A and B along the x-position line (illustrated by a circle on FIG. 4) is determined to be the location of the worker at the predetermined interaction with that vehicle. The circles on FIG. 4 illustrate the x-positions determined to be the points at which the worker carries out the predetermined interaction with each vehicle on the production line.

At step 204 of FIG. 2, the speed of the production line is determined by the computing device using the locations of the tag at the predetermined interactions. This step is not required in order to identify an article at a specified location (step 206) and hence is illustrated on FIG. 2 using a dotted box. The relative positions of the articles along the length of the production line are predetermined. For example, the distance between a first and second article may be static as the articles are transported by the production line, and that static distance known for each pair of articles. The articles may be equally spaced along the production line. The articles may be not equally spaced or transported in unison by the production line, but a formula for determining the separation of two articles at any time on the production line known.

Figure 5:
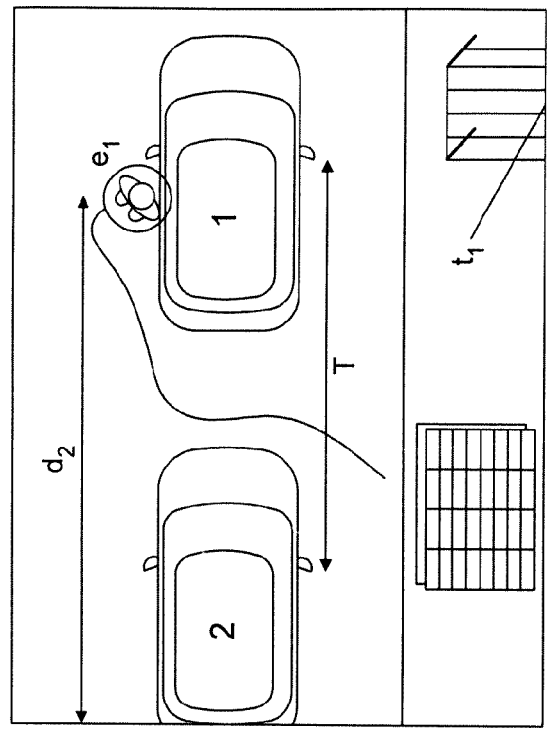
FIG. 5 illustrates articles on a production line.
Figure 5:
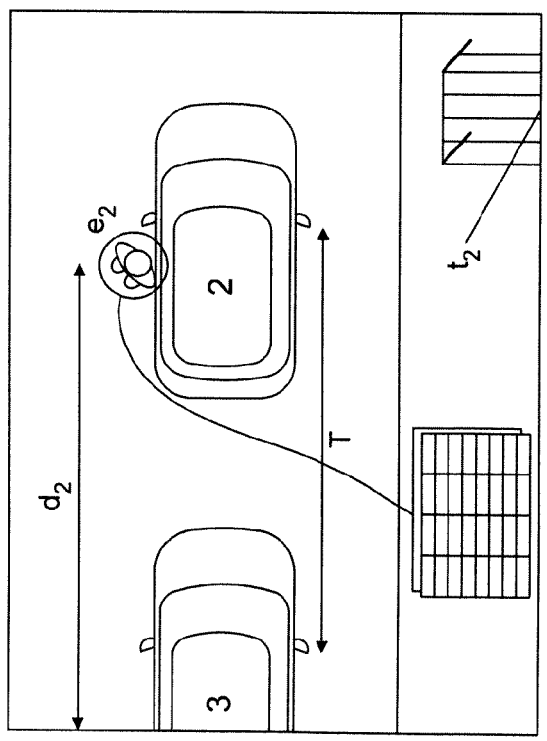

In the example of FIG. 1, the vehicles on the production line are equally spaced. This is illustrated on FIG. 5, which shows two images of the production line. The first image on the right hand side shows cars 1 and 2 on the production line. They are separated by a distance T. The worker is operating a predetermined interaction $e_1$ on car 1 at a first time $t_1$. The second image on the left hand side is taken after the image on the right hand side. The image on the left hand side shows cars 2 and 3 on the production line. They are separated by distance T. The worker is operating the same predetermined interaction $e_2$ on car 2 at a second time $t_2$. The worker executes the same motion with respect to cars 1 and 2. The worker is operating in the same area of the factory, but the production line moves to the right enabling him to perform the same operation on each car as they pass him. The elapsed time between the predetermined interactions $e_1$ and $e_2$ is:

$$\text{elapsed time between } e_1 \text{ and } e_2 = t_2 - t_1 \quad \text{(equation 1)}$$

In that time the production line has travelled a total distance of:

$$\text{total distance} = d_2 - d_1 + T \quad \text{(equation 2)}$$

If it is assumed that the line is moving with constant speed, v, then the total distance is also given by:

$$\text{total distance} = v(t_2 - t_1) \quad \text{(equation 3)}$$

Thus:

$$d_2 - d_1 + T = v(t_2 - t_1)$$

$$v = (d_2 - d_1 + T)/(t_2 - t_1) \quad \text{(equation 4)}$$

$d_2$ and $d_1$ are given by the x-positions of the predetermined interactions on cars 1 and 2. Thus, the speed of the production line can be calculated.

A more accurate value for the speed of the production line is determined by averaging the production line speeds determined using equation 4 for several pairs of cars on the production line.

The production line may stop from time to time. The production line may move with a first constant velocity during a first period, and a second constant velocity during a second period. By calculating the speed of the production line during a plurality of time periods using equation 4 and several pairs of tag locations at predetermined interactions, the motion of the production line over time can be accurately determined.

Given the production line speed in a time period, and the position of an object on the production line at one instant in that time period, the location of that object at any instant in that time period can be determined.

At step 206 of FIG. 2, an article at a specified location of the tagged object is identified. Given the location of one article on the production line at one time, the known relative positions of the articles on the production line, and the determined motion of the production line, the identity of an article at any specific location on the production line at any time can be determined.

Example Implementations

A worker on a production line may identify a flaw in an article on the production line. For example, a worker may identify a scratch on a car. In known methods, the worker would record the flaw on a handheld device and associate it with the article by scanning a tag on the article. Using the method described herein, the worker can record the flaw and that flaw can be automatically associated with the article using the location signals transmitted by the worker at the time he recorded the flaw. This eliminates the need for the worker to actively associate the flaw with the article, and hence reduces the time taken for the worker to operate on that article.

Electronic stamping is common in the manufacture of articles on a production line. This is a means of providing a quality assurance record for that article. The worker may record when certain actions have been completed. For example, in the case of vehicle manufacture, the worker may confirm that certain actions have been successfully completed for safety procedures, such as confirming that an airbag has been secured to the side wall of the car. These tasks may be linked to the tool that the worker is using. For example, measurement data from a specific tool may be recorded confirming, for example, that that specific tool was set on a specific torque and used at a specific time to tighten the screws securing the airbag to the side wall of the car. In known methods, the worker would associate the recorded information with the article by scanning a tag on the article. Using the method described herein, the actions of the worker can be associated with the article using the location signals transmitted by the worker at the time he carried out the actions. This eliminates the need for the worker to actively associate the actions with the article, and hence reduces the time taken for the worker to operate on that article.

The operation of production lines are analysed in order to identify ways to improve the efficiency with which articles are manufactured on the production line. The above described method can be used to track the locations of both the articles and the worker operating on the articles. The location of the worker relative to the article can be used to determine times during which the worker is neither moving nor performing a predetermined interaction with the article. These times are called dwell time. By analysing the motion of the worker with respect to several articles, it can be determined if there is consistent dwell time on each motion. If there is consistent dwell time, then it can be determined that the worker has longer to carry out the set of predetermined interactions on the article than is needed. The actions of the worker may then be modified to reduce the dwell time and improve the efficiency of the production line operation. For example, the worker may be given a further task to complete during the motion.

In the example described above, the worker executes the same repeated motion relative to the factory floor. The movement of the production line conveys articles past the worker. Once the worker has finished the predetermined interactions on one article, the next article is approaching him such that he can carry out the same predetermined interactions on that next article. In an alternative set up consistent with the methods described herein, the production line may stop moving relative to the factory floor. The worker may then carry out a predetermined interaction on each article. For example, the worker may walk down the production line with a cordless tool, or a tool with a long cord, and stop at each vehicle to tighten up the same screw on a wheel. In this case, the worker performs the same motion relative to each vehicle, but the worker's motion relative to the factory floor is not the same for his interaction with each vehicle. The worker may carry out a set of predetermined interactions on each article. There may be several workers carrying out predetermined interactions on each article. Once the one or more predetermined interactions have been carried out on the set of articles, the production line moves to convey another set of articles before the worker(s).

In the example described above, a tag is attached either to a worker or a tool that the worker is operating. The methods described herein are not limited to such a tag. The location signals could be received from anything that moves relative to the production line and that performs the same executed motion relative to articles on the production line. For example, a machine or robot which performs the same executed motion relative to each article on the production line could send location signals to the location system. Preferably, the source of the location signals stops moving relative to the production line whilst performing the predetermined interaction, because this aids identification of the predetermined interaction as described above.

In the examples described above, location information is received at the location system from a tag. However, the location information of the worker may be received at the location system via any suitable means. For example, a camera system may be used to track the worker. One example of a camera-based tracking system involves the worker wearing a marker, the camera system being adapted to track the marker as the worker moves around. In another example of a camera-based tracking system, the worker does not wear a marker or tag, the camera system being adapted to identify and thereby track the worker by other means. In terms of the method described with respect to FIG. 2, instead of receiving location signals from the tagged object at step 200, location information about the object (e.g. worker) may be received by any suitable means such as those described in this paragraph. The remainder of the method described with respect to FIG. 2 applies.

In the example described above, the worker operates the same motion with respect to every article on the production line. The described method is not limited to such operation. For example, there may be gaps in the production line where there is no article. There may be a further plurality of articles interspersed with the described articles, to which the worker performs no predetermined interactions or a different set of predetermined interactions. In both cases, the computing device can be configured to identify the repeated pattern in the position of the worker and to ignore non-matching patterns. So for example, if a first set of articles to which the worker performs a first set of predetermined interactions is interspersed with a second set of articles on the production line to which the worker performs a second set of predetermined interactions, then the computing device can be configured to detect a first repeating pattern of worker locations corresponding to the first set of predetermined interactions, and ignore other worker locations. Similarly, the computing device can be configured to detect a second repeating pattern of worker locations corresponding to the second set of predetermined interactions, and ignore other worker locations.

As described in the preceding paragraph, the worker may not perform the same motion with respect to every article on the production line. Furthermore, location information may not be received at the location system for every article that the worker has performed the same motion with respect to. In one example, this is because location signals have not been sent by the tag. In another example, this is because the location system has not processed the location information that has been sent to it. By only receiving location information relating to a subset of the articles on the production line, savings in processing power and processing time are achieved. The location system may only determine the locations of the worker at the predetermined interactions with a subset of the articles that it received location information about. This leads to savings in processing power and processing time. As long as the relative position of an article on the production line is known, then the identity of that article can be determined using the methods described herein, even if location information relating to that article was not received or processed by the location system.

In the examples described above, a single object is tracked. For example, a single worker or worker's tool is tracked. However, multiple objects may be tracked. For example, several tools may be tracked. In such an implementation, location information is received at the location system for some or all of the objects. The location system determines the location of some or all of the objects for which it received location information. In the example implementation in which a flaw is logged as being associated with an identified article, the flaw may be detected by an object whose location information was used by the location system in identifying the article. Alternatively, the flaw may be detected by another object whose location information was not used by the location system in identifying the article. Similarly, in the example implementation in which electronic stamping of an identified article is performed, the electronic stamping may be in respect of an action performed by an object whose location information was used by the location system in identifying the object. Alternatively, the electronic stamping may be in respect of an action performed by an object whose location information was not used by the location system in identifying the object.

Similarly, in the example implementation in which the dwell time of an identified article is determined, the dwell time may be in respect of an action performed by an object whose location information was used by the location system in identifying the object. Alternatively, the dwell time may be in respect of an action performed by an object whose location information was not used by the location system in identifying the object.

In the examples described herein, the entirety of the worker's motion with respect to one article is the same as the entirety of the worker's motion with respect to another article on the production line. As can be seen on FIG. 3, the worker performs the same motion within each pair of vertical dotted lines, but on a different article on the production line. The vertical dotted lines butt each other, such that the entirety of the worker's motion with respect to one article is the same as the entirety of the worker's motion with respect to another article. However, it is not necessary for the entirety of the worker's motion with respect to one article to be the same as the entirety of the worker's motion with respect to other articles. At least a portion of the overall motion of the worker with respect to one article is the same as a portion of the overall motion of the worker with respect to another article. The portion comprises the time during which the worker performs the same predetermined interaction with respect to the articles on the production line. Suitably, only a portion of the overall motion of the worker with respect to one article is the same as a portion of the overall motion of the worker with respect to another article. The remainder of the overall motion of the worker with respect to the articles may be different.

The production line may take the form of any known production line. For example, the production line may take the form of a conveyor belt. Alternatively, the production line may take the form of stepped blocks, like an escalator. Alternatively, the production line may take the form of separate moveable portions which do not move in unison but do move in a known way.

Figure 6:
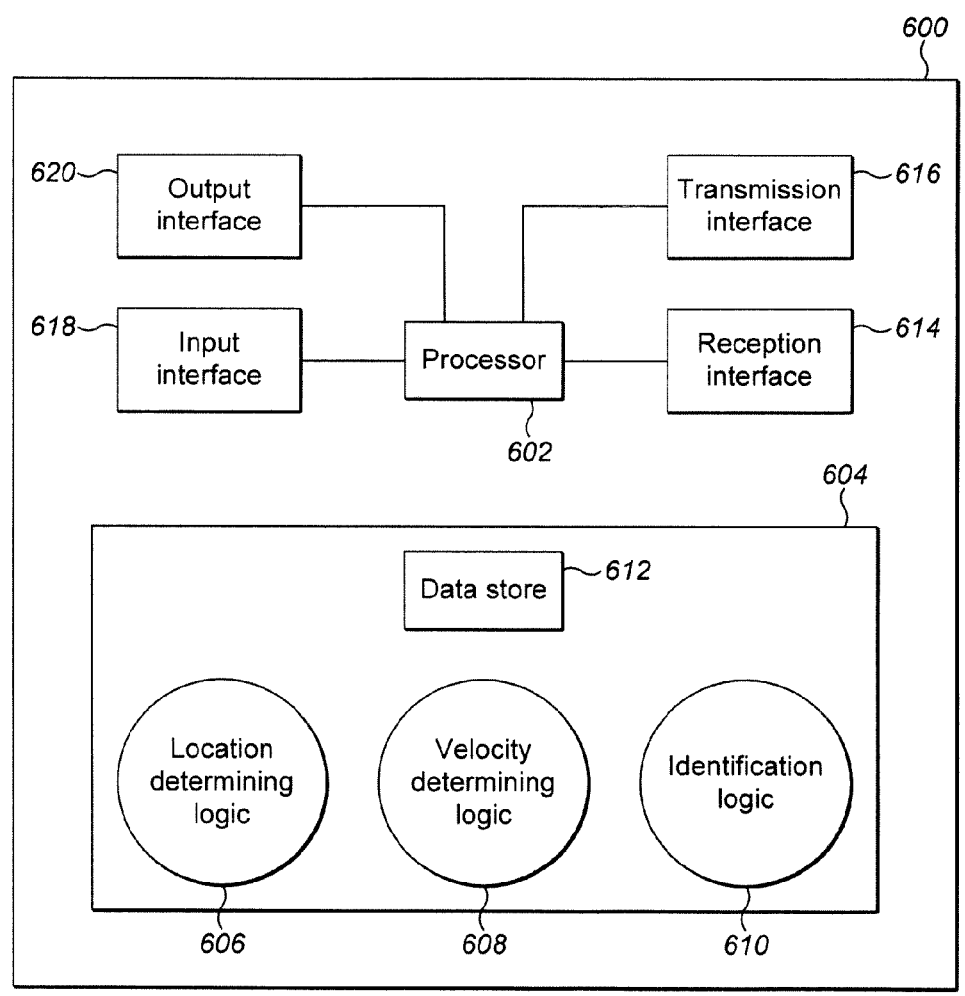
FIG. 6 illustrates an exemplary computing device in which the method of FIG. 2 may be implemented.

Reference is now made to FIG. 6. FIG. 6 illustrates a computing device 600 which is configured to implement the method of FIG. 2. The computing device 600 may be an electronic device. The computing device 600 comprises functionality used for determining the location of the tagged object, determining the speed of the production line, and identifying articles at specific locations of the tagged object.

Computing device 600 comprises one or more processor 602 for processing computer executable instructions configured to control the operation of the device in order to perform the method described with reference to FIG. 2. The computer executable instructions can be provided using any computer-readable media such as memory 604. Although memory 604 is shown as being embodied within computing device 600, it will be understood that it may alternatively be located remotely and accessed via a communication link. Further software that can be provided at the computing device 600 includes location determining logic 606 which implements step 202 of FIG. 2, velocity determining logic 608 which implements step 204 of FIG. 2, and identification logic 610 which implements step 206 of FIG. 2. Alternatively, steps 202, 204 and 206 of FIG. 2 are implemented partially or wholly in hardware. Data store 612 stores data such as the determined identification of an article, the determined velocity of the production line, a detected flaw on an article. Computing device 600 further comprises reception interface 614 which receives the location signals from the tagged object via the sensors located in the factory. Computing device 600 further comprises a transmission interface 616 which transmits data. For example, on logging a flaw detected by the tagged object, the transmission interface 616 may transmit the logged flaw to the handheld device of another worker to inform that worker to inspect the flaw when the article reaches him. The computing device also comprises an optional input interface 618 arranged to receive and process inputs from, for example, a user. The computing device also comprises an optional output interface 620 arranged to output data to, for example, a display device.

FIG. 6 illustrates a single computing device in which the method of FIG. 2 is implemented. However, the functionality described with respect to FIG. 2 may be implemented on separate computing devices.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A method of identifying an article on a production line, the production line comprising a plurality of articles along its length, the relative positions of the plurality of articles along the length of the production line being predetermined, the method comprising:
    receiving location information of an object which executes the same motion with respect to at least a first subset of the plurality of articles on the production line;
    for at least a second subset of the plurality of articles, determining from the location information the location of the object at a predetermined interaction between the object and the article; and
    identifying an article of the plurality of articles at a specified location of the object in dependence on (i) a known location of any one article of the plurality of articles at any one time, and (ii) the locations of the object at the predetermined interactions between the object and the at least second subset of the plurality of articles.

2. The method as claimed in claim 1, in which the predetermined interactions occur when the object is stationary with respect to the production line.

3. The method as claimed in claim 1, in which during each same executed motion an item performs a set of predetermined interactions, the method further comprising:
    determining dwell time of each same executed motion during which the item is neither moving nor performing the set of predetermined interactions; and
    determining a different executed motion with respect to each of the at least first subset of the plurality of articles which reduces the dwell time such that the time taken to perform the set of predetermined interactions decreases.

4. The method as claimed in claim 1, wherein the object is a tagged object, and wherein receiving location information of the object comprises receiving location signals originating from the tagged object.

5. A non-transitory tangible device-readable media with device-executable instructions that, when executed by a computing device, direct the computing device to perform steps comprising the method of claim 1.

6. A tracking system for identifying an article on a production line, the production line comprising a plurality of articles along its length, the relative positions of the plurality of articles along the length of the production line being predetermined, the tracking system comprising:
   a receiver configured to receive location information of an object which executes the same motion with respect to at least a first subset of the plurality of articles on the production line;
   a memory device;
   a processor coupled to the memory device and the receiver, wherein the processor is configured to:
   for at least a second subset of the plurality of articles, determine from the location information the location of the object at a predetermined interaction between the object and the article; and
   identify an article of the plurality of articles at a specified location of the object in dependence on (i) a known location of any one article of the plurality of articles at any one time, and (ii) the locations of the object at the predetermined interactions between the object and the at least second subset of the plurality of articles.

7. The tracking system as claimed in claim 6, the processor being further configured to determine the speed of the production line in dependence on the locations of the object at the predetermined interactions between the object and the at least second subset of the plurality of articles.

8. The tracking system as claimed in claim 6, in which the production line is in a building having a floor, wherein for each article of the at least first subset of the plurality of articles, the object's same executed motion is the same relative to the floor.

9. The tracking system as claimed in claim 6, in which the production line is in a building having a floor, wherein for each article of the at least first subset of the plurality of articles, the object's same executed motion is different relative to the floor.

10. The tracking system as claimed in claim 6, in which the production line comprises a further plurality of articles along its length interspersed with the plurality of articles.

11. The tracking system as claimed in claim 6, wherein the processor is further configured to log an action performed by an item at the specified location of the object in association with the identified article.

12. The tracking system as claimed in claim 11, in which the item is the object.

13. The tracking system as claimed in claim 6, wherein the processor is further configured to log a flaw detected by an item at the specified location of the object in associated with the identified article.

14. The tracking system as claimed in claim 6, in which during each same executed motion an item performs a set of predetermined interactions, the processor being further configured to:
   determine dwell time of each same executed motion during which the item is neither moving nor performing the set of predetermined interactions; and
   determine a different executed motion with respect to each of the at least first subset of the plurality of articles which reduces the dwell time such that the time taken to perform the set of predetermined interactions decreases.

15. The tracking system as claimed in claim 6, wherein the receiver is configured to receive the location information of the object from a camera system.

16. The tracking system as claimed in claim 6, wherein the object is a tagged object, and the receiver is configured to receive location information of the object by receiving location signals originating from the tagged object.

17. The tracking system as claimed in claim 16, in which each location signal includes an identifier of the tagged object.

18. The tracking system as claimed in claim 16, in which the location signals are ultra-wideband signals.

19. The tracking system as claimed in claim 16, comprising a computing device and a plurality of receivers having known locations.

20. The tracking system as claimed in claim 19, wherein the processor is configured to determine the locations of the tagged object from the time difference of arrival and/or the angle of arrival of the location signals at the plurality of receivers of the tracking system.

* * * * *